INVENTOR.
ALBERT COTSWORTH III
BY Francis W. Crotty
HIS ATTORNEY.

Oct. 26, 1954 A. COTSWORTH III 2,692,909

INTERCARRIER TELEVISION RECEIVER

Filed Oct. 12, 1951 2 Sheets-Sheet 2

INVENTOR.
ALBERT COTSWORTH III
BY Francis W. Crotty
HIS ATTORNEY.

Patented Oct. 26, 1954

2,692,909

UNITED STATES PATENT OFFICE 2,692,909

INTERCARRIER TELEVISION RECEIVER

Albert Cotsworth III, Oak Park, Ill., assignor to Zenith Radio Corporation, a corporation of Illinois Application October 12, 1951, Serial No. 251,070

2 Claims. (Cl. 178—5.8)

Figure 1:
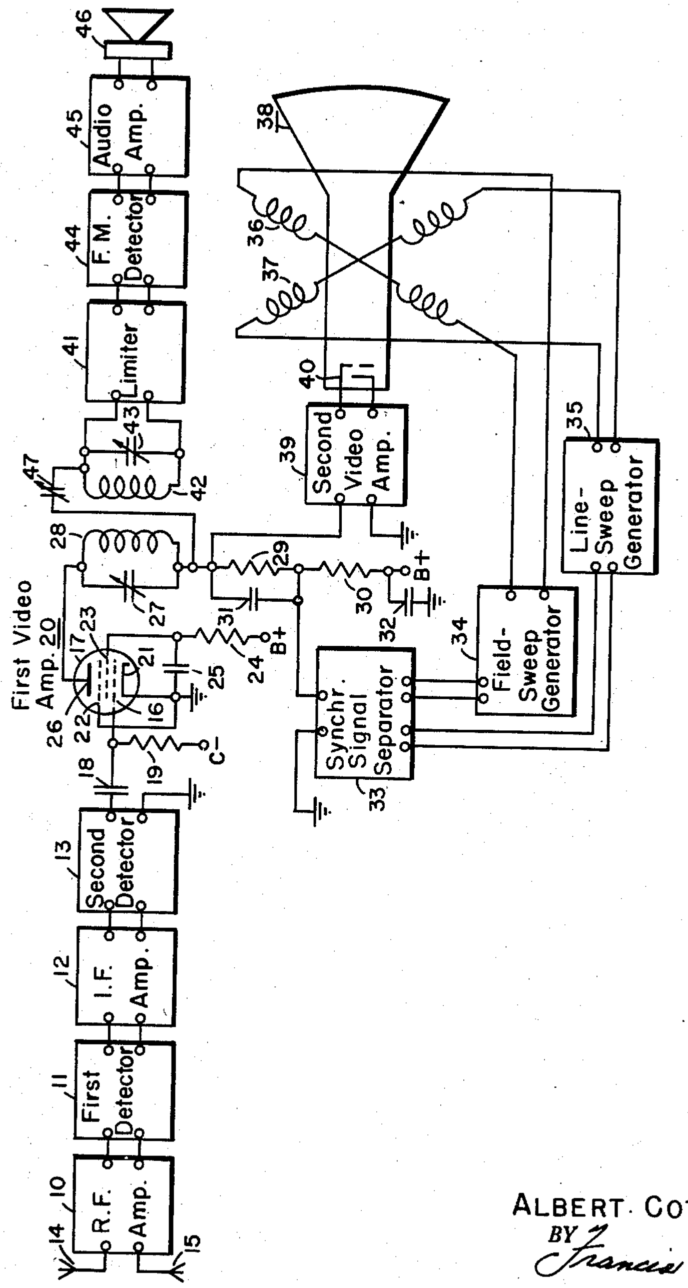

This invention relates to signal-separating networks and more particularly to an improved network for separating the sound and video components of a received television signal into the appropriate utilization channels of a television receiver.

The invention finds great utility in any system in which it is desired to separate a plurality of received frequency-displaced wave-signals or signal components into individual utilization channels. However, the immediate application of the invention is to a television receiver of the intercarrier-sound type and, accordingly, it will be described in that environment.

Before the adoption of intercarrier-sound techniques, the video-modulated carrier and the sound-modulated carrier components of an incoming television signal were usually separated in a superheterodyne type of television receiver at the output of the first detector, prior to the video intermediate-frequency amplifier. In such receivers, a separate channel is provided for the intermediate-frequency sound signal, and selective filters are used to separate the video and sound signals and direct them into their respective channels. It is necessary in those receivers to provide a highly stable heterodyning oscillator since frequency drifts of this oscillator may cause incomplete separation of the intermediate-frequency components in respect of the two intermediate-frequency channels, and undesirable interference of one signal with the other may result.

In an intercarrier-sound receiver, the video and sound intermediate-frequency components derived from a received television signal are translated through a common intermediate-frequency amplifier and both are supplied to the video detector. Present-day transmission standards require that a radiated television signal include a first carrier wave amplitude-modulated with video information and a second carrier wave frequency-modulated with the sound information and frequency displaced 4.5 megacycles from the first carrier wave. Because of this composition of the television signal, the video detector of a receiver of the intercarrier-sound type develops, in addition to the video-modulation components, a signal which shall be designated herein as an "intercarrier signal," having a mean carrier frequency of 4.5 megacycles and frequency-modulated with the sound information of the received television signal. This frequency-modulated intercarrier signal may be separated from the detected video components of the television signal by means of a network tuned to the mean frequency of the intercarrier signal and may be supplied to an appropriate system for reproducing the sound information. The intercarrier-sound system has an advantage in that the sound intermediate-frequency channel, necessary in the first-mentioned type of television receiver, is eliminated; and also in that a highly stable heterodyning oscillator is not required since separation of the video and the sound components of a received television signal is not dependent on the frequency of this oscillator.

Although intercarrier-sound systems are advantageous in that they permit simplification of a television receiver, they have heretofore been subject to certain difficulties in effecting adequate separation of the video components and the frequency-modulated intercarrier signal. In particular, it has been found that when high gain frequency-selective networks are employed to select the frequency-modulated intercarrier signal there is a strong tendency for the frequency response characteristic of the video channel to be affected, permitting a portion of the frequency-modulated intercarrier signal to be accepted by the video channel with resulting distortion.

An object of the present invention is to provide an improved network suitable for use in an intercarrier-sound television receiver for directing a plurality of received frequency-displaced wave-signals into individual utilization channels of such a receiver.

A more specific object of the present invention is to provide an improved and inexpensive network for use in an intercarrier-sound television receiver for separating the video and sound components of a received television signal and for directing these components into appropriate individual utilization channels of the receiver.

Another object of this invention is to provide an improved and simplified network for use in an intercarrier-sound television receiver for separating the sound from the video components of an incoming television signal, without adversely affecting the frequency response characteristic of the video channel.

The improved network of the invention, as previously stated is for use in an intercarrier-sound television receiver. That is, a receiver for utilizing a composite television signal including video components amplitude-modulated on a first carrier-wave and sound components frequency-modulated on a sound carrier frequency-displaced a selected amount from the picture carrier, and which comprises a detector for deriving the video components and for heterodyning the received carriers to produce an intercarrier signal frequency-modulated with the sound components.

The network includes an electron-discharge device having input and output electrodes, means for applying the video components and the intercarrier signal from the detector to the input electrodes, and an output circuit coupled to the output electrodes. The output circuit comprises a frequency-selective network tuned to the mean frequency of the intercarrier signal, and an impedance in series-circuit relation with the frequency-selective network. A second frequency-selective network is provided for coupling the first-mentioned frequency-selective network to the sound channel of the receiver to impress the intercarrier signal on the sound channel, and further means is provided for coupling the above-mentioned impedance to the video channel of the receiver to impress the video components on this latter channel. Fnally, a coupling impedance is connected in circuit between the second frequency-selective network sound and the video channel for applying a portion of the intercarrier signal to the video channel of such magnitude and phase as to compensate the portion of the intercarrier signal applied to the video channel through the first-mentioned impedance.

Figure 2A:
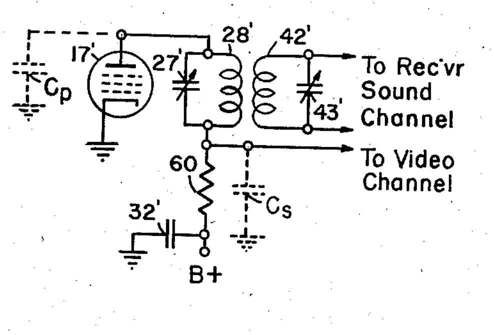
Figure 2B:
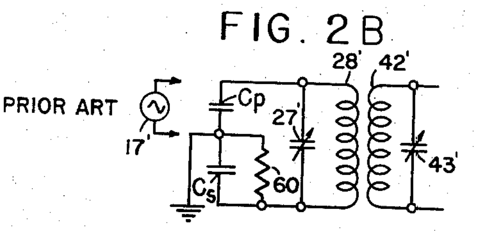
FIG. 2B PRIOR ART
Figure 3A:
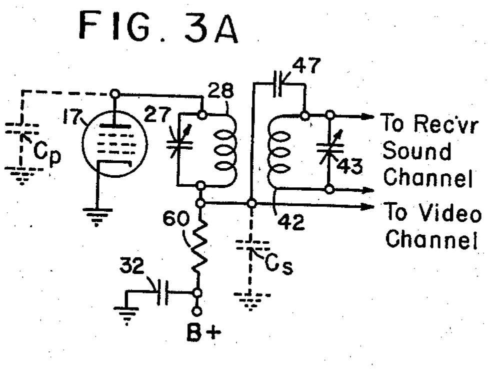
Figure 3B:
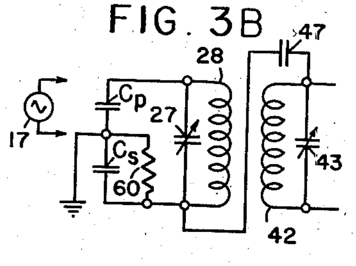

The features of this invention which are believed to be new are set forth with particularity in the appended claims. The invention itself, however, together with further objects and advantages thereof may best be understood by reference to the following description when taken in conjunction with the accompanying drawings, in which:

Figure 1 is a schematic representation of an intercarrier-sound television receiver incorporating the invention, Figures 2A and 2B show equivalent circuits of a prior-art separating network, and, Figures 3A and 3B show equivalent circuits of the separating network of the present invention.

Referring now to Figure 1, the television receiver illustrated therein comprises a radio-frequency amplifier 10 of one or more stages, a first detector 11 which includes a suitable source of heterodyning signal, an intermediate-frequency amplifier 12 of any desired number of stages, and a second detector 13, all of known construction and connected in well-known manner. The input terminals of radio-frequency amplifier 10 may be coupled to any suitable antenna circuit 14, 15. The second detector 13 is coupled to the control electrode 16 of an electron-discharge device 17 through a coupling capacitor 18, this control electrode being connected to the negative terminal C— of a suitable source of biasing potential through a grid-leak resistor 19. The discharge device 17 constitutes the first video amplifier 20 of the receiver. The cathode 21 of device 17 and the suppressor electrode 22 are connected to ground. The screen electrode 23 is connected to the positive terminal B+ of a source of unidirectional potential through a resistor 24, and is by-passed to ground through a capacitor 25. The anode 26 is connected to one terminal of a tuned circuit, comprising a capacitor 27 and an inductance coil 28, the other terminal of this circuit being connected to the positive terminal B+ of a source of unidirectional potential through series-connected resistors 29 and 30. Resistor 29 is shunted by a peaking capacitor 31 and the positive terminal of the potential source is by-passed to ground through a capacitor 32.

The junction of resistors 29 and 30 is connected to a synchronizing-signal separator 33 which, in turn, is connected to a field-sweep generator 34 and to a line-sweep generator 35. The output terminals of sweep generators 34 and 35 are coupled to the field-deflection elements 36 and line-deflection elements 37 of the receiver image-reproducing device 38. The components 33—35 are all of well-known construction and operate in the usual fashion to control the field and line scanning of the electron beam in device 38 in synchronism with the synchronizing components of a received television signal. Either or both of the sweep systems may further include conventional automatic frequency control stages for perfecting synchronization.

The input terminals of a second video amplifier 39 are coupled across resistors 29 and 30 while the output terminals of this amplifier are connected to the input electrodes 40 of reproducing device 38 to control the intensity of the electron beam developed therein in accordance with the video components of a received television signal.

The input circuit of an amplitude limiter 41 is inductively coupled to tuned circuit 27, 28 by means of a tuned frequency-selective circuit, comprising an inductance coil 42 and a capacitor 43. In accordance with the invention, a reactive impedance such as capacitor 47 provides additional coupling between selector 42, 43 and the output circuit of amplifier 20. More specifically, condenser 47 is connected between the upper extremity or high-potential terminal of network 42, 43 and the lower extremity or low-potential terminal of network 27, 28 for reasons to be discussed. The output terminals of limiter 41 are connected to a frequency-modulation detector 44 which detects the frequency-modulated sound components of the received television signal. Detector 44 is connected to an audio amplifier 45 which, in turn, is connected to a sound reproducing device 46. The components 41, 44, 45 and 46 which make up the sound channel of the receiver may be of any suitable design for detecting and amplifying the sound components of the received television signal. When desired, the components 41 and 44 may be replaced by a single limiter-discriminator gated-beam tube circuit such as disclosed in co-pending application Serial No. 7,864, filed February 12, 1948, and issued June 13, 1950 as Patent 2,511,143, in the name of Robert Adler, entitled "Electron Discharge Devices," and assigned to the present assignee. The present invention finds great utility when used in conjunction with this latter circuit since it supplies the intercarrier signal thereto with sufficient amplitude to drive the gated beam tube directly, without the need of an additional amplifier stage that may otherwise be required.

An incoming television signal intercepted by antenna circuit 14, 15 is selectively amplified in radio-frequency amplifier 10 and heterodyned to the selected intermediate-frequency of the receiver in first detector 11. The resulting intermediate-frequency signal is amplified in intermediate-frequency amplifier 12 which has a band-width adequate to translate both the video and sound intermediate-frequency components derived from the received television signal in accordance with intercarrier sound techniques. The video and sound intermediate-frequency signals are applied to second detector 13 wherein the modulation components of the video modulated signal are detected for utilization. Additionally, the video carrier and frequency-modulated sound carrier applied to detector 13 are heterodyned therein to produce an intercarrier signal having a mean frequency of 4.5 megacycles and frequency modulated with the sound information of the received television signal. The output circuit of detector 13 is arranged to pass the detected video signal and also this frequency-modulated intercarrier signal to first video amplifier 20 for amplification therein. The frequency-selective networks 27, 28 and 42, 43 are tuned approximately to the mean frequency of the frequency-modulated intercarrier signal obtained from detector 13 and select that signal, to the exclusion of the video-frequency components, for application through amplitude limiter 41 to sound detector 44. The limiter 41 suppresses residual amplitude modulation of the intercarrier signal so that substantially only the desired sound components of the received television signal are recovered in frequency-modulation detector 44. The resulting audio signal is amplified in amplifier 45 and its intelligence is reproduced by device 46.

The video and synchronizing components of the received television signal, after amplification in first video amplifier 20, are applied to network 29—31. The video signal components, developed across resistors 29, 30 and peaked due to the effect of condenser 31, are supplied to second video amplifier 39, whereas the signal voltages developed across resistor 30 alone are applied to separator 33. The synchronizing components are removed from the video components in the separator and are applied to sweep generators 34, 35 to drive these generators in synchronism with the received signal in usual manner. The sweep signals from generators 34 and 35 are supplied to field- and line-deflection elements 36 and 37 of reproducing device 38 to control the field and line scansion of the electron beam therein. The composite video signal applied to second video amplifier 39 is again amplified and impressed on input electrodes 40 of the reproducing device to control the intensity of its electron beam as previously mentioned. The conjoint effect of the intensity modulation of the electron beam and the deflection fields to which it is concurrently subjected results in the reproduction of images corresponding to the video information of the received signal.

Reference is now made to Figures 2A, 2B and 3A, 3B for an understanding of the invention. Figure 2A shows a prior art network for directing the frequency-modulated intercarrier signal from the video amplifier into the sound channel of a television receiver of the intercarrier-sound type. Figure 2B shows its equivalent circuit. The amplifier of Figure 2A comprises an electron-discharge device 17′, the cathode of which is connected to ground, and the anode of which is connected to one terminal of a tuned circuit comprising an inductance coil 28′ and a parallel connected capacitor 27′. The other terminal of tuned circuit 27′, 28′ is connected through a video load circuit 60, shown for simplicity as a resistive impedance, to the positive terminal B+ of a source of unidirectional potential, this source being by-passed to ground by a capacitor 32′. The tuned circuit 27′, 28′ is inductively coupled to a further tuned circuit 42′, 43′ connected to the sound channel of the receiver. The anode-cathode capacity of device 17′ is indicated $C_p$ and the stray capacity of load circuit 60 is indicated $C_s$. The circuit 27′, 28′ is tuned to the mean frequency of the intercarrier signal applied to the sound channel of the receiver by means of tuned circuit 42′, 43′ similarly tuned to the mean frequency thereof. Suitable means are provided for supplying the video signal appearing across the load circuit 60 to the video channel of the receiver.

In the equivalent circuit of Figure 2B, device 17′ is represented as a constant current source connected across the terminals of capacitor $C_p$ to supply the intercarrier signal to tuned circuit 27′, 28′. If circuit 27′, 28′ were of itself tuned to the mean frequency of the intercarrier signal, a minimum amount of this signal would flow through the video load circuit 60 and capacitor $C_s$, and satisfactory suppression of the intercarrier signal in the video channel of the receiver would be accomplished. However, capacitor $C_p$ represents a low-impedance path to ground for the intercarrier signal under such conditions and, since source 17′ is of the constant current type, the amplitude of the intercarrier signal supplied to tuned circuit 27′, 28′ is materially reduced. To obtain increased intercarrier signal in the circuit 27′, 28′ it is usual practice to tune this circuit so that the entire network 27′, 28′, $C_p$, $C_s$ is tuned to the mean frequency of this signal, thereby tuning the individual effect of interelectrode capacity $C_p$ out of the network or, in other words, deleting the low-impedance path across the constant current source 17′. For such conditions the intercarrier signal is supplied to tuned circuit 27′, 28′ with increased amplitude. However, for this case a material portion of the intercarrier signal flows in video circuit 60 and is added to the video components translated to the video channel of the receiver. This results in distortion of the reproduced image.

Figure 3A shows first video amplifier 20 of Figure 1, constructed in accordance with the present invention. The circuit is similar to that of Figure 2A except that capacitor 47 is connected between the high potential terminal of tuned circuit 42, 43 and the low-potential terminal of tuned circuit 27, 28 as explained previously. It is well known that the intercarrier signal voltage induced in tuned circuit 42, 43 is in phase quadrature with the intercarrier signal voltage across tuned circuit 27, 28. By virtue of capacitor 47, the intercarrier signal voltage across tuned circuit 42, 43 produces a current flow in video load circuit 60 which, in view of the phase shift introduced by capacitor 47, is in phase quadrature with the intercarrier signal appearing across tuned circuit 42, 43. This current flow is consequently in phase opposition to and compensates the intercarrier signal current flow through load impedance 60 produced by the afore-discussed tuning adjustment of the output selector 27, 28 of device 17. Therefore, while adjustment of capacitor 27 to tune the entire output circuit of amplifier 17 to the mean frequency of the intercarrier signal has a tendency to establish a flow of intercarrier signal current through video load 60 the connection of capacitor 47 produces a compensating flow of intercarrier signal current through the video load. Capacitor 47 may be made variable so that the amplitude of the compensating current may be adjusted to the proper magnitude for performing its compensating function.

The invention provides, therefore, a network for use in a television receiver or the like in which vastly improved results are achieved by means of a simple expedient. It is pointed out that the nature and location of the compensating impedance are not limited to that shown; either may be changed so long as it accomplishes the derivation of a suitably phased intercarrier signal from the sound channel to oppose the tendency of the output circuit of discharge device 17 to direct a portion of the intercarrier signal into the video channel of the receiver.

Therefore, while a particular embodiment of the invention has been shown and described, modifications may be made, and it is intended in the appended claims to cover all such modifications as fall within the true spirit and scope of the invention.

I claim:

1. In a receiver for utilizing a composite television signal including video components amplitude-modulated on a first carrier-wave and sound components frequency-modulated on a second carrier-wave frequency-displaced from said first carrier by a selected amount, said receiver comprising a detector for deriving said video components and for heterodyning said carrier-waves to produce an intercarrier signal frequency-modulated with said sound components, apparatus for receiving said television signal and for supplying said television signal to said detector, a sound channel for utilizing said intercarrier signal, and a video channel for utilizing said video components; a separating network comprising: an electron-discharge device having input and output electrodes; means for applying said video components and said intercarrier signal from said detector to said input electrodes; an output circuit for said discharge device coupled to said output electrodes including a frequency-selective network tuned to the mean frequency of said intercarrier signal and an impedance in series-circuit relation with said frequency-selective network; a second frequency-selective network coupling said sound channel to said first-mentioned frequency-selective network to impress said intercarrier signal on said sound channel; means coupling said impedance to said video channel to impress said video components on said video channel; and a coupling impedance connected in circuit between said second frequency-selective network and said video channel for applying a portion of said intercarrier signal to said video channel of such magnitude and phase as to compensate the portion of said intercarrier signal applied to said video channel through said first-mentioned impedance.

2. In a receiver for utilizing a composite television signal including video components amplitude-modulated on a first carrier-wave and sound components frequency-modulated on a second carrier-wave frequency-displaced from said first carrier by a selected amount, said receiver comprising a detector for deriving said video components and for heterodyning said carrier-waves to produce an intercarrier signal frequency-modulated with said sound components, apparatus for receiving said television signal and for supplying said television signal to said detector, a sound channel for utilizing said intercarrier signal, and a video channel for utilizing said video components; a separating network comprising: an electron-discharge device having input and output electrodes; means for applying said video components and said intercarrier signal from said detector to said input electrodes; an output circuit for said discharge device coupled to said output electrodes including a parallel-resonant network tuned to the mean frequency of said intercarrier signal and an impedance network in series-circuit relation with said resonant network; a second parallel-resonant network tuned to the mean frequency of said intercarrier signal inductively coupled to said first parallel-resonant network for impressing said intercarrier signal on said sound channel; means coupling said impedance network to said video channel to impress said video components on said video channel; and a coupling capacitor connected in circuit between said second resonant network and said impedance network for applying a portion of said intercarrier signal to said video channel of such magnitude and phase as to compensate the portion of said intercarrier signal applied to said video channel through said impedance network.

References Cited in the file of this patent

UNITED STATES PATENTS

| Number | Name | Date |
|---|---|---|
| 2,448,488 | Fyler | Feb. 21, 1950 |
| 2,504,662 | Dome | Apr. 18, 1950 |